United States Patent Office 3,528,813
Patented Sept. 15, 1970

3,528,813
SENSITIZATION OF LIGHT-SENSITIVE POLYMERS
Oskar Riester, Leverkusen, and Justus Danhäuser and Hans Öhlschläger, Cologne-Stammheim, Germany, assignors to Agfa-Gevaert Aktiengesellschaft, Leverkusen, Germany, a corporation of Germany
No Drawing. Filed Feb. 16, 1967, Ser. No. 616,465
Claims priority, application Germany, Mar. 8, 1966,
A 51,771
Int. Cl. G03c 1/68
U.S. Cl. 96—115   7 Claims

ABSTRACT OF THE DISCLOSURE

Sensitizers for photo-resist resins have the structure:

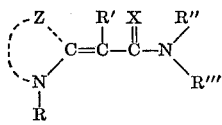

wherein Z represents the ring members required for completing a 5- or 6-membered heterocyclic ring, which heterocyclic rings may have fused thereto a benzene or naphthalene ring. Particularly suitable rings are those, for example of the indole, benzoindole, dihydroindole, thiazole, benzothiazole, naphthothiazole, selenazole, benzoselenazole, naphthoselenazole, oxazole, benzoxazole, naphthoxazole, thiodiazole or benzimidazole series; R represents alkyl having preferably up to 5 carbons atoms, or aryl preferably phenyl, or aralkyl preferably benzyl or phenylethyl, or a carboxyalkyl, sulfoalkyl, alkylsulfamide, alkylsulfate or alkylphosphoric acid group; R' represents hydrogen or alkyl having preferably up to 3 carbon atoms such as methyl or ethyl, or aryl preferably phenyl, or aralkyl preferably benzyl or phenylethyl; R″ or R‴ represents hydrogen, alkyl having preferably up to 6 carbons atoms, cycloalkyl, aryl preferably phenyl, or aralkyl preferably benzyl or phenylethyl, or R″ and R‴ together represent the ring members necessary for completing a nitrogen-containing heterocyclic, preferably 5- or 6-membered ring, e.g. a morpholine, pyrrolidine or piperidine ring; and X represents selenium or sulfur.

---

The present invention relates to the sensitization of light-sensitive polymers for use in photographic reproduction.

It is well known in the art of photomechanical reproduction to utilize light-sensitive polymers for forming resist images. These polymers are applied as a thin layer to a suitable support, which after exposure may be selectively dissolved in the unexposed areas by development with a solvent while the exposed and changed image parts of the layer remain insoluble in the solvent. Such light-sensitive synthetic resins contain light-sensitive groups such as cinnamic acid, azido or sulfazide groups.

It is also known that the light-sensitivity of these synthetic resins can be greatly enhanced by using such sensitizers as triphenylmethane dyes, aromatic ketones, or nitro compounds.

The object of the invention is to provide new sensitizers and to increase as much as possible the light-sensitivity of synthetic resins which undergo cross-linking on exposure to light.

We now have found that the light-sensitivity of synthetic resins which undergo cross-linking upon exposure, can be greatly increased by using, as sensitizers, compounds of the following formula:

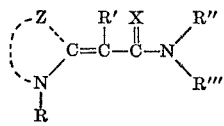

wherein

Z represents the ring members required for completing a 5- or 6-membered heterocyclic ring, which heterocyclic rings may have fused thereto a benzene or naphthalene ring. Particularly suitable rings are those, for example of the indole, benzoindole, dihydroindole, thiazole, benzothiazole, naphthothiazole, selenazole, benzoselenazole, naphthoselenazole, oxazole, benzoxazole, naphthoxazole, thiodiazole or benzimidazole series;
R represents alkyl having preferably up to 5 carbon atoms, or aryl, preferably phenyl, or aralkyl, preferably benzyl or phenylethyl or a carboxyalkyl, sulfoalkyl, alkylsulfamide, alkylsulfate or alkylphosphoric acid group;
R' represents hydrogen or alkyl having preferably up to 3 carbon atoms such as methyl or ethyl, or aryl preferably phenyl, or aralkyl preferably benzyl or phenylethyl;
R″ or R‴ represents hydrogen, alkyl having preferably up to 6 carbon atoms, cycloalkyl, aryl preferably phenyl, or aralkyl preferably benzyl or phenylethyl, or R″ and R‴ together represent the ring members necessary for completing a nitrogen-containing heterocyclic, preferably 5- or 6-membered ring, e.g. a morpholine, pyrrolidine or piperidine ring and
X represents selenium or sulfur.

The heterocyclic rings or aryl groups contained in the above formula may be further substituted in any way desired, e.g. with alkyl containing preferably up to 5 carbon atoms, such as methyl or ethyl, halogen such as chlorine or bromine, alkoxy containing preferably up to 5 carbon atoms, such as methoxy or ethoxy, or hydroxyalkyl, thioalkyl, aryl such as phenyl, or aralkyl such as benzyl, or amino or substituted amino.

The nature of these substituents is of secondary importance for the sensitising effect, but other physical properties, such as solubility, can be varied as desired by suitable choice of substituents.

Compounds of the following formulae, for example, are suitable (1) 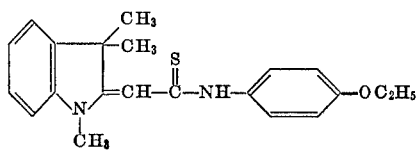

(2) 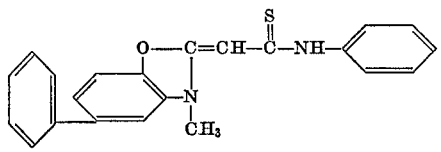

(3) 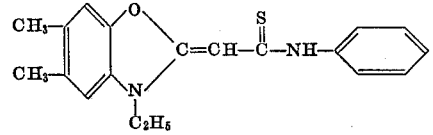

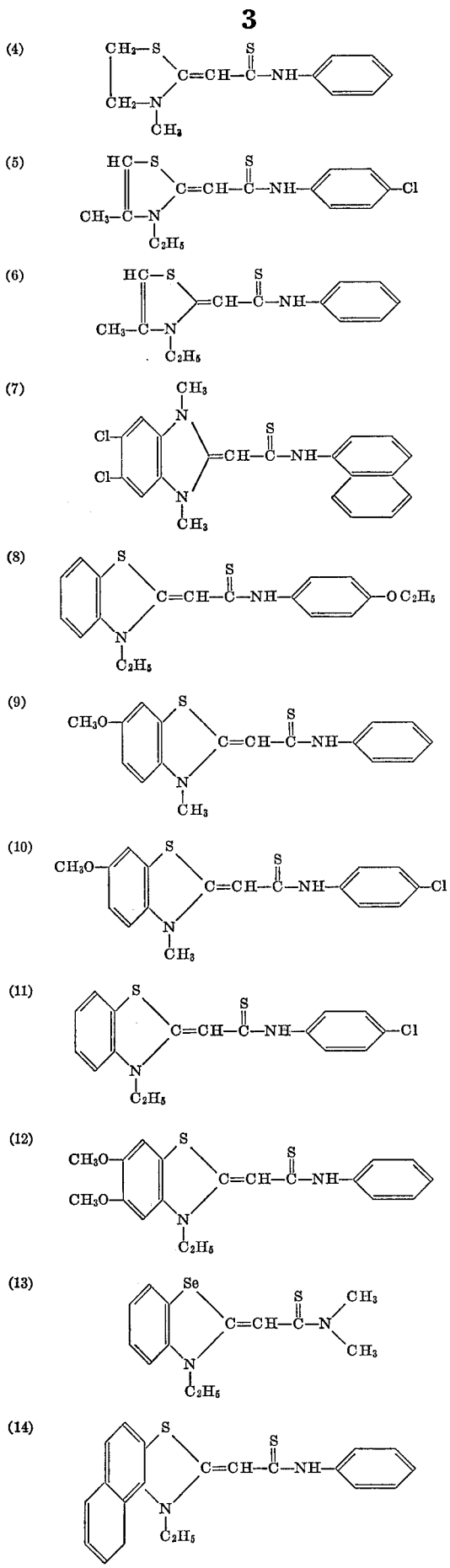
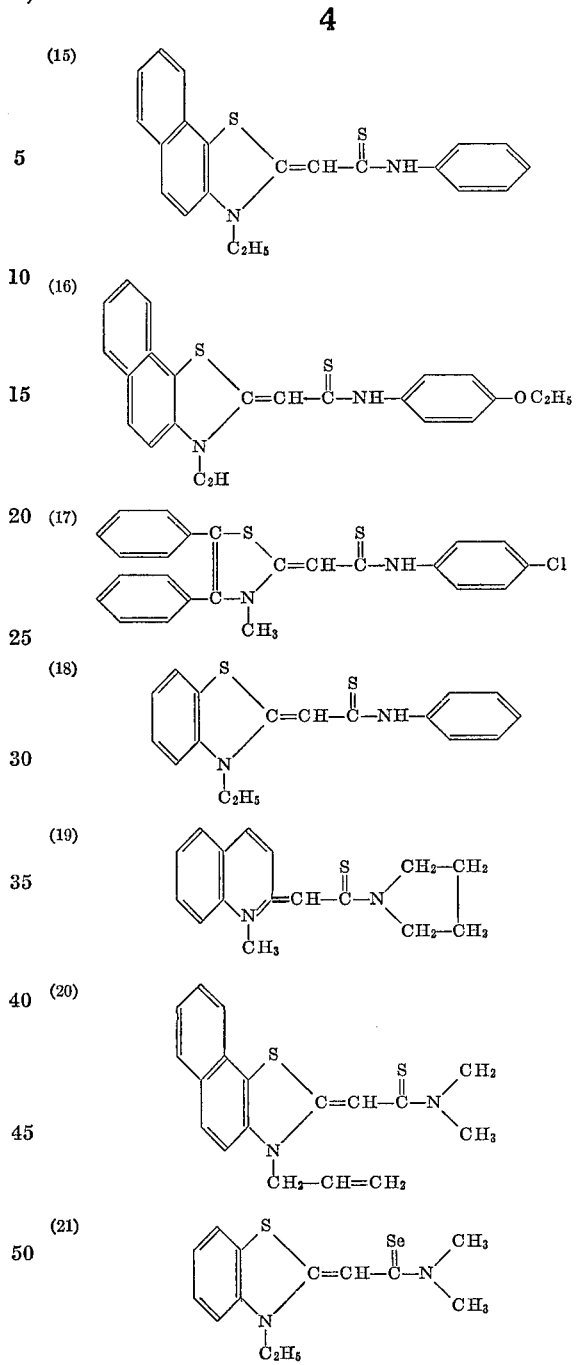

The sensitizers of the present invention may be prepared according to common practice for example:

(1) by reacting the corresponding amides with phosphorus pentasulfide or pentaselenide, (2) by reacting the corresponding dithioesters with the required primary or secondary amines, (3) by reacting methylene compounds with isothiocyanates (R''=H) (see Ber. 57 (1924) p. 522–532, Ber. 72 (1939) p. 2109, Ber. 80 (1947) p. 546 or U.S. Pat. No. 2,536,986).

The preparation of some sensitizers is described in detail below.

SENSITIZER 17

4.2 g. of 2,3-dimethyl-4,5-diphenyl-thiazoliumtosylate are heated in an oil bath with 1.7 g. p-chlorophenylisothiocyanate in 10 cc. pyridine to 120° for 5 minutes. The reaction solution is poured on ice and the crude product is suction-filtered, washed with alcohol and is recrystallised from benzene, M.P. 234–235° C.

SENSITIZER 20

64 g. of 2-methyl-3-allyl-6,7-benzo-benzothiazolium-bromide are dissolved in 500 ml. of methanol and 30 ml. water. 60 ml. $CS_2$ and 23 ml. 50% sodium hydroxide solution are added dropwise to this solution with stirring, the temperature thereby rising to 27° C. After a reaction time of 90 minutes the resulting precipitate is suction-filtered. It is recrystallised from 130 ml. methylpyrrolidone. 3.2 g. of this product are heated with 40 ml. pyridine, 15 g. dimethylamine and 2.2 g. lead oxide in an autoclave at 150° C. for 5 hours. The solution is suction-filtered and the residue is boiled with 300 ml. acetone. After treatment with animal charcoal, the combined filtrates are concentrated to half their volume by evaporation and 50 ml. methanol is added. The crystallized product is filtered off under suction. Yield 0.75 g., M.P. 235–235.5° C.

SENSITIZER 21

6 g. of 2-(methylene-carboxylic acid dimethylamide)-3-ethyl-benzothiazoline are heated to boiling in a mixture of 100 ml. chloroform and 8 ml. triethylamine, and 6 g. of phosphorus pentaselenide are slowly added. After filtration under suction, the residue is treated with water and then boiled with 250 ml. benzene. The combined filtrates are decolourised with animal charcoal and concentrated by evaporation. The product obtained is recrystallised from 600 ml. cyclohexane. Yield 3.45 g., recrystallised from methanol. M.P. 182–186° C.

The sensitisers used according to the present invention generally increase the light-sensitivity of polymers which undergo cross-linking upon exposure to light. They are particularly suitable for use in combination with those light-sensitive polymers in which the groups capable of cross-linking under the effect of light are cinnamic acid or azido groups.

Polymers of this type, and light-sensitive layers produced therefrom have been described, for example, in British patent specifications Nos. 695,197 and 822,861.

Polymers containing azido groups are described in British patent specifications Nos. 843,542, 843,541 and 815,471. Polymers containing sulfazide groups are described in German patent specification No. 1,224,494 and Belgian Pat. Nos. 665,427 and 645,428.

Other suitable light-sensitive polymers are described in German patent applications Nos. A48874 IXa/57b and A51476 IXa/57b.

The sensitizers according to the invention are employed in the usual manner. As a rule, the light-sensitive synthetic polymers are dissolved in suitable solvents, and the sensitizer is added to the casting solution.

The concentration of sensitizer in the light-sensitive layer is not critical and depends somewhat upon the solubility of the sensitizing agent in the particular solvent used in the light-sensitive polymer of the final layer. A required concentration depends furthermore on the original sensitivity of the light-sensitive polymer and to some extent on the thickness of the final layer, whereby it will vary according to a slightly lower concentration usually employed in the case of thicker layers in order to ensure thorough hardening of the layer.

The optimum concentration can be determined in known manner by a few simple tests customarily employed in the art. Generally, a concentration of about 0.5 to 10%, preferably 2 to 7% by weight is sufficient.

The sensitized layers of the present invention are processed in accordance with common practice. The sources of light employed are preferably high-energy carbon arc lamps or mercury vapour lamps. After exposure, the layer is developed in known manner by dissolving out the unexposed parts of the layer. Suitable solvents and solvent concentrations for the coating compositions and for developing the exposed sensitive layers of the invention can be selected from those set forth in the patent specifications mentioned hereinbefore. The relief images obtained can then be used in the usual ways.

EXAMPLE 1

4 g. of a reaction product of 1 part of ethylene-vinyl alcohol copolymer and 2 parts of m-isocyanato-cinnamic acid ethyl ester (see British patent specification No. 822,861) and 0.04 g. sensitizer No. 8 are dissolved in 46 g. butyl acetate. An aluminum foil is coated with the solution in a centrifuge (100 revolutions per minute) and dried for 5 minutes.

The layer is exposed for 5 minutes behind a grey step wedge with a carbon arc lamp (30 a., 42 v.) at a distance of 70 cm. and developed for 2 minutes in butyl acetate which contains 0.1% Irisolechtblau BLE (CIS591). The layer is washed with water and dried in air. 13 steps of the grey wedge are visible on the support.

If the layer is exposed under the same conditions without the addition of sensitizer, then only 4 steps of the grey wedge are visible. Density of step 4: 0.46, step 13: 1.86. It follows from this that there is a 25-fold increase in sensitivity on the addition of sensitizer.

The effect of other sensitizers of the present invention which are applied as described above instead of sensitizer 8 are shown in the following table:

| Sensitizer No.: | Relative sensitivity |
|---|---|
| 1 | 9 |
| 2 | 12 |
| 3 | 12 |
| 4 | 9 |
| 5 | 17 |
| 6 | 12 |
| 7 | 6 |
| 9 | 25 |
| 10 | 25 |
| 11 | 25 |
| 12 | 25 |
| 13 | 25 |
| 14 | 25 |
| 15 | 25 |
| 16 | 25 |
| 17 | 25 |
| 18 | 18 |
| 19 | 1.5 |
| 20 | 18 |
| 21 | 9 |

The sensitivity of the sensitized layer with respect to the non-sensitized layer was calculated from the number of coloured steps of the layer remaining on the support according to the equation:

$$Sx = \frac{\text{antilog } Dx}{\text{antilog } Do}$$

where $Dx$ is the density of the grey wedge of the last sensitized layer still adhering to the support and $Do$ is the density of the grey wedge of the last non-sensitised layer still remaining on the support.

EXAMPLE 2

The procedure carried out is the same as that described in Example 1, but the ethylene-vinyl alcohol copolymer of Example 1 is replaced by a polymer obtained by reacting 10 g. of a copolymer of vinyl chloride and vinyl alcohol with 7.3 g. of p-azido-benzoyl chloride in pyridine (see also British patent specification No. 843,541).

The increase of sensitivity is shown in the following table:

| Sensitiser No.: | Relative sensitivity |
|---|---|
| 8 | 9 |
| 9 | 12 |
| 14 | 12 |
| 15 | 12 |
| 18 | 17 |

EXAMPLE 3

The procedure carried out is as described in Example 1. The light-sensitive polymer used is that described in Example 7 of German patent specification 1,224,494.

The effects of the sensitizers used according to the invention are summarised in the following table:

| Sensitiser No.: | Relative sensitivity |
|---|---|
| 8 | 3 |
| 9 | 4 |
| 14 | 4 |
| 15 | 4 |
| 18 | 4 |

The increase in sensitivity is determined as described in Example 1.

What is claimed is:

1. A composition comprising a light-sensitive film-forming polymer selected from the group consisting of polymers containing cinnamic acid groups or azide groups and a sensitizing amount of a sensitizer of the following formula:

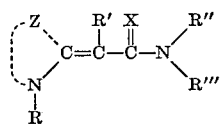

wherein:

Z represents the ring members required for completing indole, benzoindole, dihydroindole, thiazole, benzothiazole, naphthothiazole selenazole, benzoselenazole, naphthoselenazole, oxazole, benzoaxazole, naphthoxazole, thiodiazole or benzimidazole ring;

R represents alkyl, aralkyl, aryl, carboxyalkyl, sulfoalkyl, alkylsulfamide, alky sulfate or alkyl phosphoric acid;

R' stands for hydrogen, alkyl, aralkyl or aryl;

X represents selenium or sulfur;

R" and R'" represent hydrogen or alkyl, cycloalkyl, aryl or aralkyl and

R" and R'" together represent the ring members necessary for completing a 5- or 6-membered heterocyclic ring;

said polymer being capable of undergoing cross-linking upon exposure.

2. A composition as defined in claim 1, in which the light-sensitive polymer contains light-sensitive cinnamic acid or azido groups.

3. A composition as defined in claim 1, in which the sensitizer has the formula:

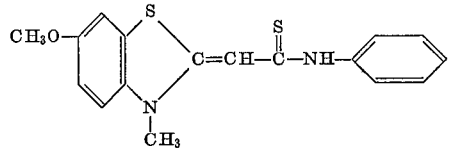

4. A composition as defined in claim 1, in which the sensitizer has the formula:

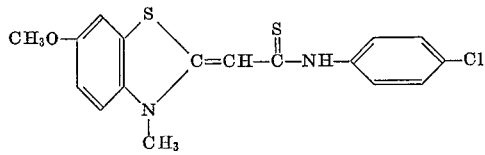

5. A composition as defined in claim 1, in which the sensitizer has the formula:

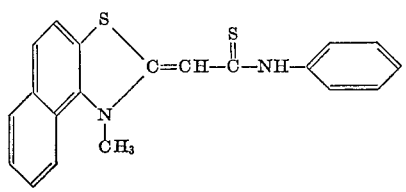

6. A composition as defined in claim 1, in which the sensitizer has the formula:

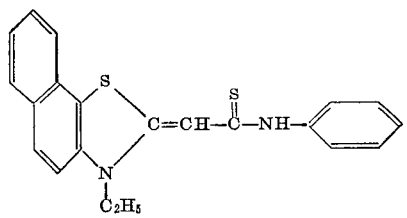

7. A composition as defined in claim 1, in which the sensitizer has the formula:

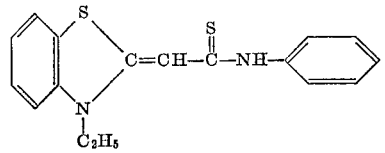

References Cited

UNITED STATES PATENTS

| 2,732,301 | 1/1965 | Robertson et al. | 96—115 |
| 3,173,787 | 3/1965 | Clement et al. | 96—115 XR |

RONALD H. SMITH, Primary Examiner

U.S. Cl. X.R.

96—35.1